June 10, 1969     D. GOLDSTEIN ET AL     3,449,075

PRODUCTION OF BARIUM HYDROXIDE MONOHYDRATE

Filed Nov. 15, 1966

1 mm 1 mm

United States Patent Office 3,449,075
Patented June 10, 1969

3,449,075
PRODUCTION OF BARIUM HYDROXIDE
MONOHYDRATE
David Goldstein, East Brunswick, and Robert Joseph
Gleason, Iselin, N.J., assignors to FMC Corporation,
New York, N.Y., a corporation of Delaware
Filed Nov. 15, 1966, Ser. No. 594,513
Int. Cl. C01f 11/02
U.S. Cl. 23—186                                          10 Claims

ABSTRACT OF THE DISCLOSURE

Process for the production of barium hydroxide monohydrate wherein particles of hydrated barium hydroxide containing a plurality of moles of water per mole of $Ba(OH)_2$ are heated in a fluidized bed to an elevated temperature whereby said particles are dehydrated and converted to particles of barium hydroxide monohydrate which are recovered from said bed.

---

Figure 1:
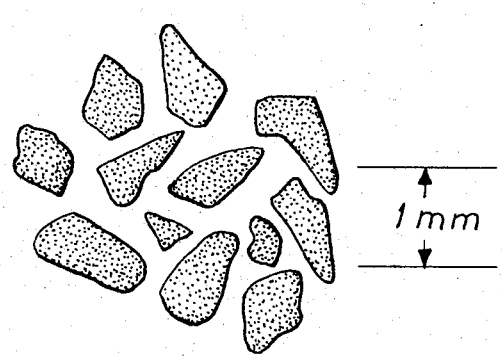

This invention relates to the production of barium hydroxide monohydrate.

The production of barium hydroxide monohydrate has been described in U.S. Patent 3,082,066 of Mar. 19, 1963, of Bennie Le Roy Benning and Carl John Cuneo. While the product of the patented processes has many advantages, under certain conditions of low humidity it has a tendency to cake in the tote bin in which it is shipped, and the user may therefore find it difficult, under those circumstances, to remove the caked material from the bin and put the material into suitable condition for use.

One object of the invention is the production of barium hydroxide monohydrate in a form resistant to caking.

Other objects of the invention will be apparent from the following detailed description and claims.

In accordance with one aspect of the invention, particles of highly hydrated barium hydroxide hydrate containing a plurality of moles of water per mole of $Ba(OH)_2$ are supplied to a heated fluidized bed through which there is passed a drying gas, and particles of barium hydroxide monohydrate are recovered from the bed.

In a preferred form of the process, the particles of the highly hydrated barium hydroxide are produced from a hot liquid aqueous barium hydroxide solution (which solution is solid at room temperature) containing about 5 to 8 moles of water (more preferably about 5 to 6 moles of water) per mole of $Ba(OH)_2$, by cooling the solution as a thin film, cracking the solidified film to form flakes, granulating the flakes, and removing particles of larger size from the granulated material to give a fluidizable mixture consisting essentially of particles (of substantially the same water content as the liquid feed) having a particle size smaller than about 10 mesh (U.S. Standard Screen) (about 2 mm. particle diameter); more preferably the particles are smaller than about 20 mesh (0.84 mm.).

The feed particles are preferably of high-purity, having a total $Ba(OH)_2$ and $H_2O$ content of over 95%, e.g. at least about 97%, more preferably at least about 98%. Typically, the feed particles will comprise a partially crystalline mixture of $Ba(OH)_2 \cdot 8H_2O$, $Ba(OH)_2 \cdot 4H_2O$ and $Ba(OH)_2 \cdot H_2O$.

The operations of cooling and cracking the film are preferably carried out on a drum flaking device, by passing the hot liquid continuously onto the upper, outer surface of the internally water-cooled continuously rotating drum of the device and cracking the cooled solidified film (which may be for example about 0.3 to 1 mm. thick, preferably in the range of about 0.4 to 0.8 mm. thick) by contact with a stationary blade mounted close to the periphery of the drum; the drum surface is, of course, maintained at a temperature well below the solidification temperature of the hot liquid solution (e.g., at a temperature below 60° C., preferably about 20 to 50° C.). Typically, the resulting flakes are substantially flat, about the same thickness as the solidified film and about 1½ to 7 mm. across.

The granulation of the flakes may be effected in a rotary mill, e.g., a mill having two parallel plates mounted close together, at least one of the plates being rotated continuously while the flakes are fed continuously through an aperture aligned with its axis of rotation. The granulating operation generally produces a quantity of fines (e.g., of particle size such as to pass through a 100 or 150 mesh screen) and may also yield oversize particles; the oversized particles are separated, as by suitable screens, and recycled to the mill. The fines may be similarly separated out by screens and then recycled for admixture into the feed of hot aqueous solution which is to be supplied to the flaking device, or they may be left in with the granulated material and removed in the subsequent fluidization step, as described below.

The fluidization of the particles can be effected in a suitable vessel, generally of tubular shape (e.g., squat circular cylindrical shape), through which the drying gas (preferably air) is passed at a velocity sufficient to form a fluidized bed of the particles. For particles of the preferred size, previously described, bed linear gas velocities in the range of about ½ to 2 ft./sec. (and preferably about 0.8 to 1.7 ft./sec.) may be used. For best results, the temperature of the bed should be lower than the melting point of the feed particles; the melting point of the preferred feed (barium hydroxide "pentahydrate" containing about 5 to 6 moles of water per mole of barium hydroxide) is about 111° C., and bed temperatures in the neighborhood of 80° C. are preferred. It is found, however, that the heating surface in contact with the bed may be at much higher temperatures (e.g., 200° C.) without causing melting or caking of the hot particles in the bed; this makes it possible to operate the bed more economically, by having a relatively large temperature difference (e.g., a difference in the range of about 40–140° C.) between the temperature of the heating surfaces and the temperature of the bed so that heat transfer to the bed takes place in a highly efficient manner. In one arrangement the heat is transferred from the outer surfaces of a number of spaced parallel vertical tubes within the bed, while steam under superatmospheric pressure (e.g., 210 p.s.i.g.) is passed through these tubes; the bed temperature is controlled by regulating the rate at which the steam is fed to the tubes.

The gas used for fluidization is preferably substantially inert to the particles in the bed. When air is used, it may be treated, as by passing it through a caustic scrubber, to remove carbon dioxide and thus minimize the formation of undesired barium carbonate. Nitrogen or other inert gas may also be used. The gas is preferably preheated to a temperature well above the bed temperature (e.g., to a temperature in the range of about 120 to 200° C.) before it is brought into contact with the fluidized bed (where it supplies some of the heat needed for the dehydration reaction and vaporization of the water). As is conventional in fluidization processes, the gas is preferably passed through a distributor such as a perforated plate, just below the bed.

The preferred process is carried out at substantially atmospheric pressure. There is no need to go to the expense and trouble required for operation at subatmospheric or superatmospheric pressures. It is, however, within the broader scope of the invention to employ sub- or superatmospheric pressures.

The gas leaving the bed may be treated to remove any fines carried out of the bed, as by scrubbing the gas with water; the fines dissolve in the water to form a barium hydrate solution which is recycled to the hot solution to be fed to the flaking device. If desired, the resulting cooled, humid gas (having a temperature below that of the bed, e.g., a temperature of about 30° C.) may be recycled to the bed, after passing through a preheater. It has been found that despite the relatively crumbly nature of the surface of the particles of barium monohydrate produced in accordance with this invention [the particles powder easily when pressed between one's fingers], the proportion of fines produced during the fluid bed treatment is very small, e.g., about 5–10% of the product, as compared to the fines obtained by such dehydration processes as spray drying of liquefied highly hydrated barium hydroxide.

The desired barium hydrate monohydrate may be drawn off from the fluid bed. In continuous operation, the rate of removal of this product is about the same (based on barium content and adjusted for the small amount of material lost as fines) as the rate of supply of the highly hydrated material fed to the bed, so as to maintain steady state conditions. In such continuous operation, there is a relatively high rate of back-mixing of fresh feed with material already in the bed and the average residence time in the bed may be relatively long, e.g., over an hour, such as about 3 to 6 hours. In the preferred continuous process, a stream of the feed particles of highly hydrated barium hydroxide is fed continuously to a fluidized bed whose particles consist essentially of barium hydroxide monohydrate. At the preferred high bed temperatures (e.g., at least 60° C. but preferably below 100° C.), the dehydration of the individual feed particles occurs rapidly. At lower temperatures, the reaction is slower and longer bed residence times are needed in the continuous process to attain a product of the desired purity. For batch operation, very short residence times, e.g. about 2 minutes, as well as residence times of about 1½ hours have given good results.

Figure 2:
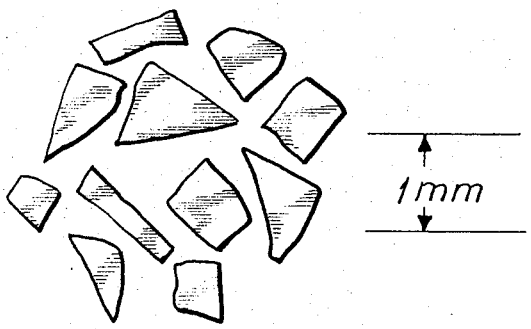

A typical product of this invention is illustrated in the enlarged view in FIG. 1, showing the flat, angular monohydrate particles of substantially uniform thickness, which are obtained from a granulated feedstock of similarly shaped "pentahydrate" particles shown in enlarged view in FIG. 2. In the feed particles, and the product, the length of the particle is generally not more than about twice its width, the proportion of more elongated particles being minor. The flat particles generally have face areas in the range of about 1/10 to 1 sq. mm. The monohydrate particles are very white and form a chalky powder when rubbed lightly with the fingers. In contrast, the pentahydrate particles are opalescent, much less white, and much harder and stronger; they are unaffected when rubbed between the fingers. Monohydrate particles produced by the above described fluidized bed dehydration treatment have also been found to be substantially weaker than monohydrate particles made in accordance with the melt-dehydration process of the Benning and Cuneo patent mentioned above. Their resistance to caking on storage in bins has, however, been found to be much greater, even at the low humidities which promote caking of the melt-dehydrated product. Also, although the particle densities of the fluidization product are relatively low (e.g., about 1.7 g./cc. vs. 2.1 g./cc. for a typical melt-dehydrated product) their bulk densities are, surprisingly, as high as the bulk densities of melt-dehydrated products (e.g., 65 lb./cu. ft. vs. 65 lb./cu. ft.) so that a given weight of the fluidization product can be shipped in the same size containers as the same weight of the previous product. Also, despite their fragility, the particles flow readily without formation of fines and can be transported without damage by conventional means, such as vibrating conveyors. The pore volume of the particles is generally in the range of about ¼ to ½ cc./g. (e.g., about 0.3 cc./g.), the mean pore size is typically about 1.1 microns (as determined with an Aminco-Winslow porosimeter).

The following specific examples are given to illustrate this invention further:

EXAMPLE 1

In a continuous process, a stream of liquid barium hydroxide "pentahydrate" at a temperature of 111° C. is fed to a water-cooled flaker and then to granulator (such as a Fitzmill grinder). The resulting "pentahydrate" flake is screened to eliminate particles which pass through a 100 mesh screen and particles which are retained on a 20 mesh screen, and then fed continuously to a fluidized bed about 20 feet high contained in a vertical circular tube or column 8 feet in diameter above a perforated air-distribution plate while $CO_2$-free air, preheated to a temperature of about 160° C. is passed through the bed at a velocity of 1.6 ft./sec. The bed is heated internally by spaced vertical stainless steel steam pipes, within the bed, carrying saturated steam at about 90 p.s.i.a. (about 160° C. steam temperature). The bed temperature is about 80° C. The particulate material of the bed is withdrawn continuously, at a rate such that the average residence time in the bed is about 4 hours, the discharged material (barium hydroxide monohydrate) being cooled, in a rotating drum continuous cooler, to a temperature of about 40° C. before storage in a bin. The air leaving the bed is passed through a wet scrubber where any fines are dissolved.

EXAMPLE 2

In a batch run, 1000 grams of barium hydroxide "pentahydrate" flake (containing 64.77% $Ba(OH)_2$ and 0.64% $BaCO_3$) is granulated to −20 +100 mesh and charged to a bed in a 3.75 inch diameter tube, jacketed with hot oil at a temperature of 140–148° C., while nitrogen gas is metered up through the tube, and through a fritted glass distribution disc just below the bed, at a velocity (through the bed) of 0.8 ft./sec. The resulting fluidized bed is thus treated for 1.4 hours during which the bed temperature is in the range of 44–53° C. The product assays 99.3% $Ba(OH)_2 \cdot H_2O$. On a $BaCO_3$-free basis, the assay is 99.9% $Ba(OH)_2 \cdot H_2O$.

EXAMPLE 3

In another batch run, 400 grams of granulated barium hydroxide "pentahydrate" flake of −20 +100 mesh) are charged to a 2 inch diameter bed externally heated electrically while nitrogen is passed through the bed, to fluidize and dehydrate it, at a velocity of 1.42 ft./sec. The bed temperature during a 50 minute run is in the range of 45–56° C. Substantially complete conversion to $Ba(OH)_2 \cdot H_2O$ occurs.

EXAMPLE 4

The same equipment as in Example 3 is used for the fluidization and dehydration of a mixture of 200 grams of barium hydroxide monohydrate (produced by the fluidized bed technique from the same −20 +100 mesh pentahydrate as in Example 3) and 50 grams of the granulated "pentahydrate" flake used in Example 3. The bed temperature is 69° C., the nitrogen velocity is 1.61 ft./sec. and the run is carried out for 5 minutes. Substantially complete conversion to $Ba(OH)_2 \cdot H_2O$ occurs.

EXAMPLE 5

In another batch run, the bed is contained in a vertical tube 1¾ inch in diameter and heated internally by a centrally located carbon electric resistance heater, ⅝ inch in diameter, extending vertically through the length of the tube. The bed charge is 60 grams of barium hydroxide monohydrate (material made in a previous fluidized bed batch run in the same equipment using a bed temperature of 58° C. and a residence time of about 50 minutes) and 20 grams of the "pentahydrate" flake used in Example 3; the nitrogen velocity is 1.74 ft./sec. through the annular bed; the maximum temperature at the surface of the heating rod is 200° C.; the bed temperature is 78° C.; and the duration of the run is 2.5 minutes. Substantially complete conversion to $Ba(OH)_2 \cdot H_2O$ occurs. There is no evidence of caking of the bed.

The above examples are carried out at atmospheric pressure unless otherwise indicated. Bed temperatures are measured simply by inserting a thermocouple or thermometer into the bed, the temperatures are substantially uniform within the bed, except at its peripheral portions.

The caking tendency of a typical product of the fluidized bed process herein described may be compared with that of a typical product obtained by the process of the Benning and Cuneo patent mentioned above, by a test similar in results to actual experience in long distance bulk shipping, as follows: Three hundred grams of the test material is poured into a 3⅛ inch diameter split cup. A piston, 3 inches in diameter, is then placed in the cup on top of the charge. A load is then applied on the piston by means of a No. AP–170 Soiltest compression machine. Loads of 735–1200 lb. are used with times of 1–2.5 hours. The caking tests are made in a relatively dry atmosphere of less than 14 mm. $H_2O$ vapor partial pressure. The material in the cup is then poured onto a screen having ¼ inch openings and the screen is shaken slightly by hand. The percentage of material remaining on the screen is reported as the "percent caked." For the product of the Benning and Cuneo patent, the percent caked is 97–99% and the cake is hard or very hard (depending on the time and pressure). Typical products of this invention show only 26–40% caked and the caked material is very soft and easily broken up by slight pressure between the fingers; the product has the same granular characteristics after the load tests as before, very little powder being formed.

While the preferred process employs a feed which is entirely solid, it is within the broad scope of the invention to supply the highly hydrated barium hydroxide (e.g., the "pentahydrate" or octahydrate) to the bed in molten form by spraying liquid particles thereof onto a heated fluidized bed of solid particles of the monohydrate.

Another procedure is to use granulated crystals of barium hydroxide octahydrate as the feed material. Thus, the octahydrate may be crystallized out from an aqueous barium hydroxide solution, by cooling in well-known manner, and the crystals can be dried and granulated (e.g., to 20–100 mesh particle size) before feeding them to the fluid bed.

In a continuous process, it is preferable to operate under conditions which give a monohydrate product having an assay well over 95%, e.g. about 97 to 98%, of $Ba(OH)_2 \cdot H_2O$ on an impurity-free basis; that is, there is well over 0.95 mole of $Ba(OH)_2$ per mole of water. In batch operation, an assay of 100%, on the same basis, can be attained readily.

Although the present invention has been described with reference to particular embodiments and examples, it will be apparent to those skilled in the art that variations and modifications can be substituted therefor without departing from the principles and true spirit of the invention.

What is claimed is:

1. Process for the production of barium hydroxide monohydrate which comprises forming a film of molten highly hydrated barium hydroxide, cooling said film to solidify it, breaking up said cooled material to produce solid feed particles containing about 5 to 8 moles of water per mole of $Ba(OH)_2$, supplying said feed particles to a bed, passing a drying gas through said bed to fluidize it, maintaining said fluidized bed at an elevated temperature below the melting point of said particles to remove water from the particles, and recovering particles of barium hydroxide monohydrate from said bed.

2. Process as in claim 1 in which the particle size of said feed particles is less than about 10 mesh.

3. Process as in claim 2 in which said feed particle size is less than about 20 mesh.

4. Process as in claim 2 in which said feed particles consist essentially of substantially flat particles having a thickness of about 0.3 to 1 mm. and a face area of about 1/10 to 1 square mm.

5. Process as in claim 1 in which the feed particles are fed continuously to a heated fluidized bed whose particles consist essentially of barium hydroxide monohydrate, and said bed particles are withdrawn continuously from said bed, the temperature of said bed being at least about 60° C. and below the melting temperature of said feed particles.

6. Process as in claim 5 in which the bed is heated by a heat-transfer surface having a temperature which exceeds the bed temperature by at least about 40° C.

7. Process as in claim 6 in which the difference between the bed temperature and the heating surface temperature is in the range of about 40 to 140° C.

8. Process as in claim 5 in which said bed particles are fragile particles which crumble when rubbed between the fingers, and said feed particles are stronger and resistant to such crumbling.

9. Process as in claim 7 in which said bed particles are fragile particles which crumble when rubbed between the fingers, and said feed particles are stronger and resistant to such crumbling, said feed particles having a particle size less than about 20 mesh and containing about 5 to 6 moles of water per mole of barium hydroxide, said feed particles and said bed particles consisting essentially of substantially flat particles about 0.3 to 1 mm. thick whose face area is in the range of about 1/10 to 1 square mm., a major proportion of said particles having a length:width ratio of at most about 2, said bed particles containing at least about 0.97 mole of $Ba(OH)_2$ per mole of $H_2O$, having a pore volume of about ¼ to ½ cc. per gram and, on removal from said bed, being highly resistant to caking under pressure even in dry atmospheres having an $H_2O$ partial pressure of less than 14 mm., the gas velocity in said bed being about ½ to 2 feet per second.

10. Process as in claim 9 in which said gas velocity is about 0.8 to 1.7 feet per second and the bed temperature is about 80° C.

References Cited

UNITED STATES PATENTS

| | | | |
|---|---|---|---|
| 1,017,593 | 2/1912 | Rollin | 23—186 |
| 3,082,066 | 3/1963 | Benning et al. | 23—186 |

FOREIGN PATENTS

| | | |
|---|---|---|
| 1,000,301 | 8/1965 | Great Britain. |

OTHER REFERENCES

Marti et al.: "Chemical Abstracts," vol. 55, 1961, col. 24351–24352.

Priestley: "Chemical Engineering," July 9, 1962, pp. 125–132.

EDWARD J. MEROS, *Primary Examiner.*